United States Patent
Ahmed et al.

(10) Patent No.: US 11,113,105 B1
(45) Date of Patent: Sep. 7, 2021

(54) COMPUTER IMPLEMENTED SYSTEM AND METHOD FOR GENERATING PLATFORM AGNOSTIC DIGITAL WORKER

(71) Applicant: Infosys Limited, Bangalore (IN)

(72) Inventors: Syed Quiser Ahmed, Bangalore (IN); Venkata Subrahmanya Rajagopal Neralla, Bangalore (IN)

(73) Assignee: INFOSYS LIMITED, Bangalore (IN)

( * ) Notice: Subject to any disclaimer, the term of this patent is extended or adjusted under 35 U.S.C. 154(b) by 0 days.

(21) Appl. No.: 17/237,869

(22) Filed: Apr. 22, 2021

(30) Foreign Application Priority Data

Jun. 9, 2020 (IN) .............................. 202041024077

(51) Int. Cl.
*G06F 9/48* (2006.01)
*G06F 9/52* (2006.01)

(52) U.S. Cl.
CPC .............. *G06F 9/4881* (2013.01); *G06F 9/52* (2013.01)

(58) Field of Classification Search
None
See application file for complete search history.

(56) References Cited

U.S. PATENT DOCUMENTS

| | | | |
|---|---|---|---|
| 7,386,522 B1 | 6/2008 | Bigus et al. | |
| 7,660,820 B2 * | 2/2010 | Alexander | G06Q 10/10 718/100 |
| 8,583,467 B1 * | 11/2013 | Morris | G06Q 10/06312 705/7.26 |
| 9,483,307 B2 * | 11/2016 | Turner | G06F 3/0484 |
| 9,817,967 B1 | 11/2017 | Shukla et al. | |
| 10,338,956 B2 * | 7/2019 | Al-Jarro | G06F 11/3409 |
| 10,449,670 B2 | 10/2019 | Mummigatti et al. | |
| 10,503,627 B2 | 12/2019 | Radhakrishnan et al. | |
| 10,528,367 B1 * | 1/2020 | Liu | G06F 9/4498 |
| 10,768,980 B2 * | 9/2020 | Gupta | G06F 9/466 |
| 10,853,130 B1 * | 12/2020 | Barrett | G06F 15/163 |
| 10,970,098 B2 * | 4/2021 | Karoliwal | G06F 9/45512 |
| 11,061,925 B2 * | 7/2021 | Fu | G06F 9/4881 |
| 2013/0073079 A1 | 3/2013 | Ouchi | |
| 2019/0147382 A1 * | 5/2019 | Krishnamurthy | H04L 63/102 705/7.26 |

(Continued)

OTHER PUBLICATIONS https://automationedge.com/platform/, published Jul. 28, 2017, modified Aug. 19, 2020.

(Continued)

*Primary Examiner* — Van H Nguyen
(74) *Attorney, Agent, or Firm* — Troutman Pepper Hamilton Sanders LLP (Rochester)

(57) ABSTRACT

A computer implemented system and method for generating a platform agnostic digital worker includes identifying a task to be performed by the digital worker. A specification for the digital worker is generated that comprises at least a pre-defined standard for configuration of input and output parameters and error handling. A digital worker created by an agent based on the specification is received to deploy the digital worker at an orchestration engine. The digital worker is sequenced into a repository of digital workers in a predefined manner of workflow, where the digital worker is configured to execute sequentially to perform a scheduled task.

12 Claims, 4 Drawing Sheets

Data flow during digital worker execution

(56) References Cited

U.S. PATENT DOCUMENTS

2019/0180746 A1  6/2019 Diwan et al.
2019/0303779 A1* 10/2019 Van Briggle ....... G06F 11/3013

OTHER PUBLICATIONS https://www.automationanywhere.com/products/bot-insight, published Jan. 30, 2021.
https://www.ibm.com/downloads/cas/MY2RB2WK, last modified Apr. 21, 2019.
https://prolifics.com/digital-business/intelligent-automation/, published Feb. 1, 2020, modified Mar. 11, 2020.
https://www.pega.com/topics/software-bots#p-606b7528-fa51-4e78-80d1-20193e31ef8b, published Jul. 31, 2018.

* cited by examiner

COMPUTER IMPLEMENTED SYSTEM AND METHOD FOR GENERATING PLATFORM AGNOSTIC DIGITAL WORKER

This application claims the benefit of Indian Patent Application Serial No. 202041024077 filed Jun. 9, 2020, which is hereby incorporated by reference in its entirety.

FIELD

This technology generally relates to method and system for creating a platform agnostic virtual workforce. More specifically, examples of this technology relate to creation of digital workers and a workforce that can perform high end tasks similar to humans in a platform agnostic manner.

BACKGROUND

DPA (Digital Process Automation) is a concept that describes the automation of an organization's procedures and processes using software. DPA is a generic concept and does not define specific technologies, although it does give special relevance to certain aspects within automation and the technology that can be used. While planning the DPA strategy, it is important to evaluate and leverage the appropriate technologies. In practice, a good approach to a DPA implementation is achieved by using BPA technology combined with RPA technology, since they complement each other; BPA (Business Process Automation) is the automation of Business Process Management methodology that defines the orchestration of data, users and systems through end-to-end business processes. This methodology arose as a standardization of workflows and decisions that were previously drawn on paper; RPA (Robotic Process Automation) is a software automation technology that emulates user interaction with computer applications, acting primarily at the graphical interface level. Once an RPA bot has been trained to capture and interpret the actions of specific processes in existing software applications, it can then perform its assigned task autonomously. RPA expedites back-office and middle-office tasks in a wide range of industries, which include, without limitation, manufacturing, health care, telecom, insurance, finance, procurement, supply chain management (SCM), accounting, customer relationship management (CRM), and human resource management (HRM).

Any organization carries out similar, repetitive and predictable tasks across different activities (HR, Payrolls, Finance, Marketing, Banking, Application Development, Maintenance, Consulting, and Engineering etc.), day in day out. Owing to this "defined work", people are left with little or no time to perform innovative and value-added tasks/activities. Accelerated automation of such "defined work" will help people bring in better value. Traditional automation using Java/Python or other programming languages or scripts will work only when the business applications provide suitable API's for automation. However, the overall ROI is not very high with traditional automation because of the long development cycles. Front-end automation using RPA tools can provide solutions in the areas where script/API based automation is not possible and only UI based automation can be done and provide better ROI. However, the reliability of front-end automation is low owing to the continuous changes in the user experience layer of the new age applications. Similarly, the cognitive capabilities of RPA platforms are limited. Examples of this technology provide a solution to bring in a hybrid approach that can leverage various technologies to provide front-end as well as API based and cognitive automation capabilities in a single platform.

Current Automation tools mostly come with an in-built dashboard so users have to maintain multiple such dashboards when they are in a multi-platform scenario. Consolidating metrics from these dashboards is a big challenge because each tool has its own format and way of logging and tracking data. Examples of this technology help overcome this challenge by providing a standardized service for Logging & Telemetry that can be consumed by bots from any technology. This enables to have a unified data and metrics which can be consolidated into a one-stop dashboard.

The existing solutions do not solve the problem of providing a seamless integration of digital workers across different technologies using a standard format of data exchange. Examples of this technology provide the solution to this problem by standardization of the Digital worker Specification parameters like input data format, output data format, error handling mechanism for digital workers across different technologies. Since the digital workers have standard structure and the data exchange is also in a standard format, this facilitates interconnection between digital workers from different technologies.

Digital workers are strategically designed by identifying common patterns in IT & business activities and breaking them into smaller tasks. These activities span across Application Maintenance, Application Development and activities performed by Business users or BPM teams. These granular tasks are automated into digital workers that can be potentially reused across all industry domains and business functions. Multiple Digital workers can be stitched together to perform an end to end automated process, using a common digital identity.

SUMMARY

A computer implemented system and method for generating of platform agnostic digital workers comprising of an orchestration editor to identify a task to be performed by the digital worker by generating a specification for the digital worker. The specification comprises at least a predefined standard for configuration of input and output parameters and error handling. An application programming interface is configured to receive a digital worker created by a user based on the specification to deploy it at an orchestration engine and dynamically grouping the digital worker into a repository of digital workers in a predefined sequence to perform a business activity.

The digital worker is configured to communicate across heterogeneous platforms based on the predefined specification using a common data communication format; wherein the predefined specification comprises of template to define input, output and exception details. The repository of digital workers is generated based on the digital worker metadata information, digital worker binaries and digital worker source code.

The orchestration editor is configured to retrieve the digital worker metadata and configuration parameters from the repository. The digital workers can be interconnected or interchangeable within the configuration editor. Digital Workers that perform similar tasks in the target environment and follow the same Specification can be interchanged within the orchestration editor.

BRIEF DESCRIPTION OF THE DRAWINGS

The embodiments of this invention are illustrated by way of example and not limitation in the figures of the accompanying drawings, in which like references indicate similar elements and in which.

DETAILED DESCRIPTION

Exemplifying embodiments, as described below, may be used to provide a method, an apparatus and/or a system of configuring a smart assistant for domain specific self-service.

Although the present embodiments have been described with reference to specific example embodiments, it will be evident that various modifications and changes may be made to these embodiments without departing from the broader spirit and scope of the various embodiments.

Figure 2:
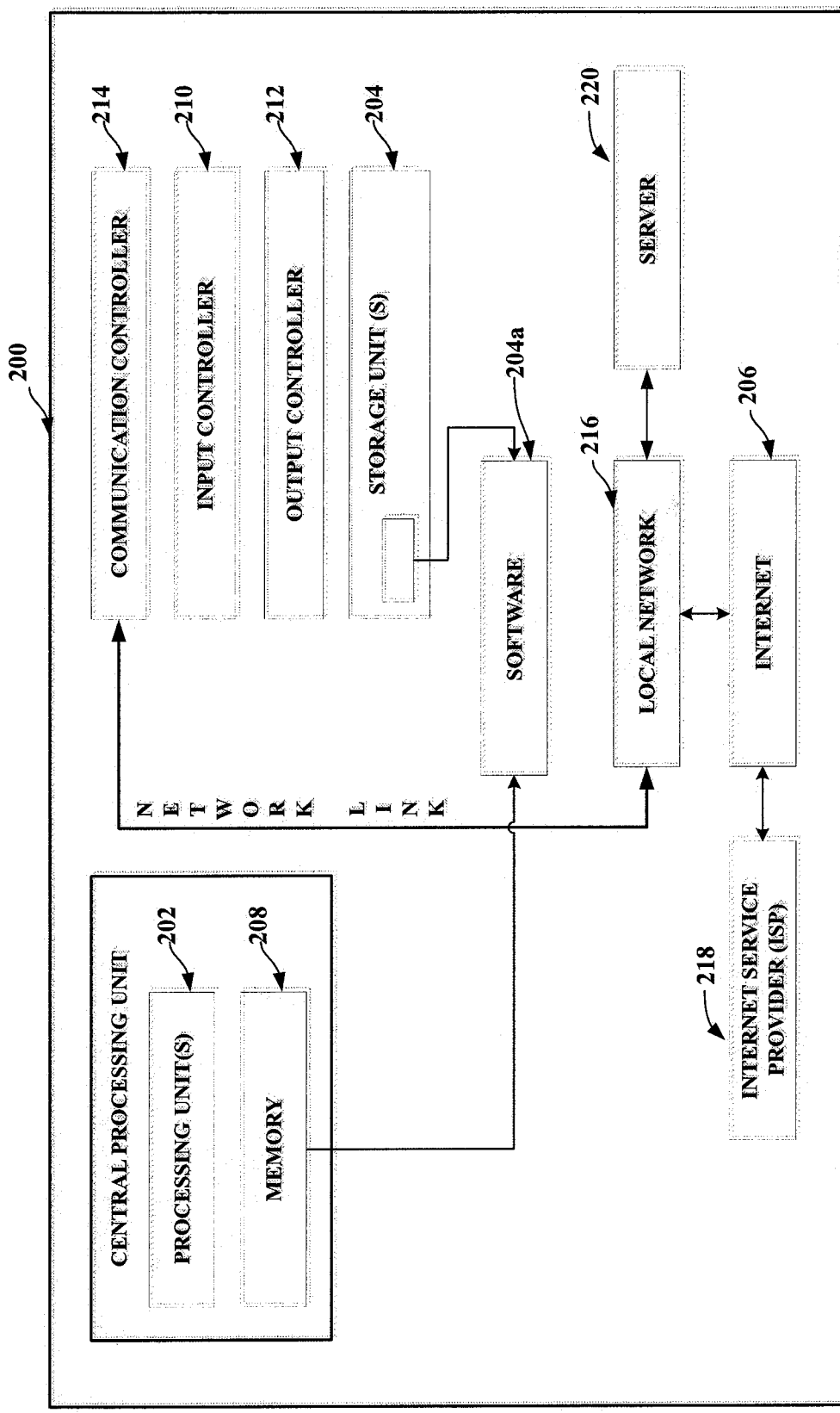
FIG. 2 is block diagram of an exemplary computing system configured to facilitate generating a platform agnostic digital worker.

FIG. 2 is a block diagram of a computing device 200 to which examples of this technology may be applied. The system includes at least one processor 202, designed to process instructions, for example computer readable instructions (i.e., code) stored on a storage device 204. By processing instructions, processing device 202 may perform the steps and functions disclosed herein. Storage device 204 may be any type of storage device, for example, but not limited to an optical storage device, a magnetic storage device, a solid-state storage device and a non-transitory storage device. The storage device 204 may contain software 204a which is a set of instructions (i.e. code). Alternatively, instructions may be stored in one or more remote storage devices, for example storage devices accessed over a network or the internet 206. The computing device also includes an operating system and microinstruction code. The various processes and functions described herein may either be part of the microinstruction code or part of the program (or combination thereof) which is executed via the operating system. Computing device 200 additionally may have memory 208, an input controller 210, and an output controller 212 and communication controller 214. A bus (not shown) may operatively couple components of computing device 200, including processor 202, memory 208, storage device 204, input controller 210, output controller 212, and any other devices (e.g., network controllers, sound controllers, etc.). Output controller 212 may be operatively coupled (e.g., via a wired or wireless connection) to a display device (e.g., a monitor, television, mobile device screen, touch-display, etc.) in such a fashion that output controller 212 can transform the display on display device (e.g., in response to modules executed). Input controller 210 may be operatively coupled (e.g., via a wired or wireless connection) to input device (e.g., mouse, keyboard, touch-pad, scroll-ball, touch-display, etc.) in such a fashion that input can be received from a user. The communication controller 214 is coupled to a bus (not shown) and provides a two-way coupling through a network link to the internet 206 that is connected to a local network 216 and operated by an internet service provider (hereinafter referred to as 'ISP') 218 which provides data communication services to the internet. Network link typically provides data communication through one or more networks to other data devices. For example, network link may provide a connection through local network 216 to a host computer, to data equipment operated by an ISP 118. A server 220 may transmit a requested code for an application through internet 206, ISP 218, local network 216 and communication controller 214. Of course, FIG. 2 illustrates computing device 200 with all components as separate devices for ease of identification only. Each of the components may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 200 may be one or more servers, for example a farm of networked servers, a clustered server environment, or a cloud network of computing devices.

Figure 1:
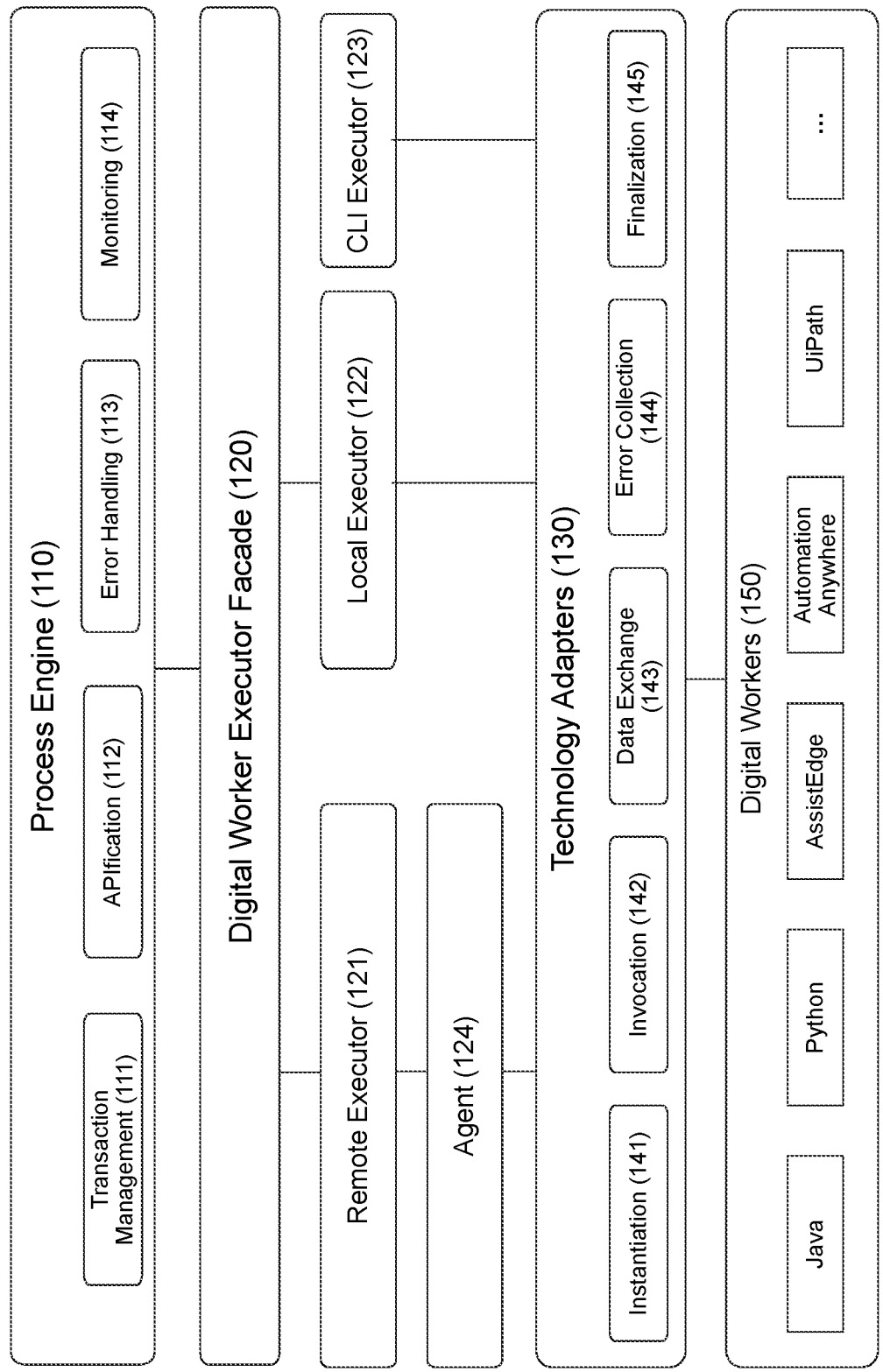
FIG. 1 is an example of a sequence depicted through a block diagram for the data flow involved in digital worker execution.

The data flow involved in digital worker execution is captured herein through FIG. 1. A common framework is used for exchanging instructions between the digital workers (150) and a process engine (110). The process engine may be operatively coupled with the orchestration engine and configured to perform various functions including Transaction Management (111), APIfication (112), Error Handling (113) and Monitoring (114). A Digital worker Executor Façade (120) defines a generic execute method that is used by the process engine to interact with the digital workers. Digital worker Executor Facade in turn invokes relevant technology adapters that will interact with the digital workers based on the technologies. The digital worker executor façade may be operatively coupled to Remote Executor (121), Local Executor (122) and/or a CLI Executor (123) The Technology Adapter (Digital worker Executor) takes care of the life cycle (160) of the digital worker instance including instantiation (141), Invocation (142), Data Exchange (143), Error Collection (144) and Finalization (145). During the execution phase the logging and troubleshooting is handled through a common logging framework wherein all the troubleshooting can be done from within the framework. The digital worker is created by an agent (124) based on the specification to deploy it at an orchestration engine. For Robotic Process Automation (RPAs) digital workers, the status and basic debugging information is logged centrally and advanced debugging is to be performed on respective RPA servers. While running the digital workers in stand-alone mode on the native runtime/RPA platform, the telemetry data is generated only if the relevant boilerplate code is available in the digital worker and the telemetry services are installed in the environment. Without it, only basic telemetry provided by the respective platforms is available.

During the development stage, based on the guidelines specified in the digital worker specification, the combination of digital workers are also developed. As a next step, the combination of digital workers are tested. Then the tested combination of digital workers are published as a virtual workforce and ensured that they have been created adhering to the guidelines which were specified in the platform. The published combination of digital workers and the workforce are deployed in the servers as per the requirement. The deployed virtual workforce is configured to execute based on various trigger points and schedules. During the operations, various aspects like monitoring, reporting, troubleshooting and telemetry are captured. Once the new digital workers or their combination is developed and the earlier versions are rendered obsolete and they are retired from the platform to avoid the overhead of maintaining too many versions. The digital workers may be from any technology like, but not limited to, Java, Python, AssistEdge, Automation Anywhere, UiPath and the likes.

Figure 3:
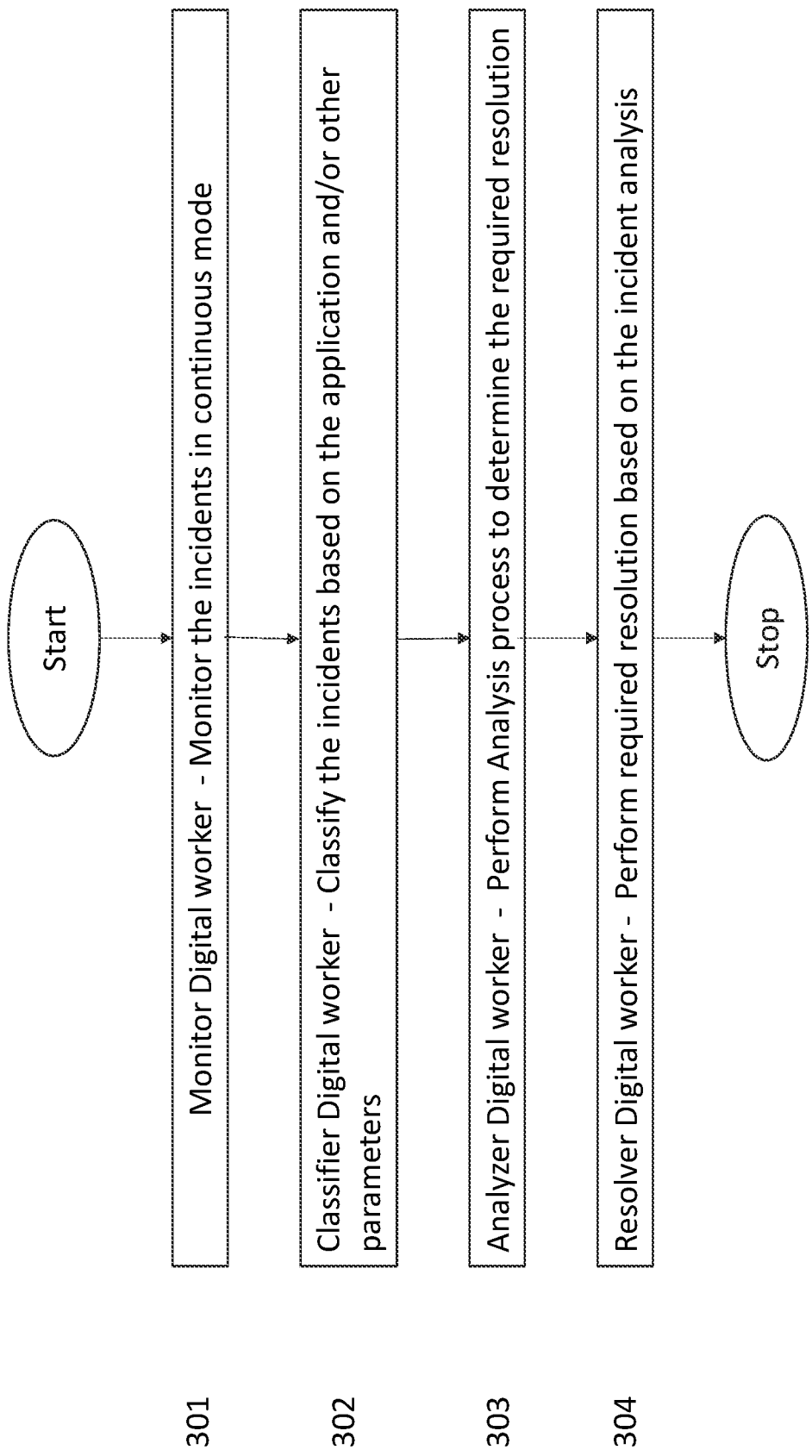
FIG. 3 is a flow chart of an example of a method for an Incident Management Digital Worker performing detection, validation, enrichment, classification, assignment and auto-resolution of tickets.

In a specific example of the system, as explained in FIG. 3, an Incident Management Digital Worker performs detection, validation, enrichment, classification, assignment and auto-resolution of tickets. FIG. 3 is only explaining a few examples of this technology. It is in no way limiting the scope of the implementation or the process as disclosed in this patent application. Here the tickets are incidents or problems that are recorded in any typical information systems. The ticket resolution workflow can be automated using the present platform comprising of multiple digital workers and their specific combinations (taken from a digital worker database) and orchestrated using orchestration editor.

In step 301, Monitor digital worker will monitor the incidents in continuous mode to ensure that the process is not disrupted. In step 302, a Classifier digital worker will classify the incidents based on the application and other parameters. In step 303, Analyzer digital worker will carry out the analysis process to determine the required resolution and assigns it to the corresponding Resolver digital worker. In step 304, a Resolver digital worker performs the required resolution based on the analysis process. The platform contains the digital worker database wherein the digital workers and their specific combinations are developed to be compatible with various technologies, industries, and platforms as per the requirements.

As used herein, a "robotic process automation module", "RPA module", "robot", "bot" or "digital worker" may refer to a, device, tool, system, application, or the like for performing automated processes on a user device, computer system, server, or the like. Robotic process automation may refer to the automation of high-volume processes using said modules. An RPA module is typically specialized computer software or hardware installed on a device that mimics user interaction with a user interface (UI). For example, an RPA module may provide inputs to the UI of other applications. The RPA module may typically interact with a presentation layer of the computer system (i.e., the UI) and avoids more demanding interaction with any underlying data layers or logic of the underlying system in order to instruct operation of the user device, computer system, application, or the like. In some embodiments, the module may be configured to repeat one or more tasks assigned to the module. Further an RPA module is scalable, wherein a plurality of bots may be used to perform various functions for high-volume applications related to executable tasks of said entity.

In one embodiment, the digital worker may be configured to perform the micro tasks like login, extract, process, publish, update, delete etc. A collection of such digital workers may be further configured to perform activities such as perform an end to end business activity or task like Ticket management, DB management, platform management etc. These activities are nothing but a collection of the above tasks.

In another embodiment, digital workers are automation components or digital workers performing defined micro tasks with atomic functionality that can be built using different technologies and technology platforms. Like any other SDLC a digital worker is configured to have different stages starting from identifying the need to retiring the digital worker.

In a typical embodiment, a clear need for automation of the process is to be established. Once the process is broken down to task level and the task is then evaluated for the requirement and determine if it is fit candidate for RPA. It is further verified if a similar digital worker already exists to perform the specified task in required technology or across different technology areas. If such a digital worker exists, the existing digital worker can be reused and extended if required upon checking of feasibility across process, technology and operations. Establish best way for users to consume or use this digital worker. Each digital worker is typically required to be configured as reusable with a re-usability index as high as possible within the RPA. The above decisions and analysis are performed by an SME. Alternatively, this can be performed using machine learning techniques emulating the decisions taken by an SME based on specified parameters.

In one embodiment, once the need for creation of a new digital worker is established in the earlier step, generation of a new digital worker is initiated. Subsequently, the generation of a specification for the digital worker is initiated through the orchestration editor. The specification comprises at least a predefined standard for configuration of input/output parameters and error handling criteria. A suitable specification can be searched from a suitable connected repository and extended as required through the orchestration editor. In absence of a suitable specification, a new specification may be created through the orchestration editor. Specifications thus created are reviewed and approved by an SME through the orchestration editor. A digital worker specification serves as the design for new digital worker creation.

In one embodiment, the digital worker is configured to communicate across heterogeneous platforms based on the predefined specification using a common data communication format where the orchestration editor translates the data from digital workers configured in different technology platforms into a common format, i.e., JSON (JavaScript Object Notation); wherein The development guidelines for a particular technology define the aspects that allow for maximum interoperability and interchangeability while also allowing for the best mode for reuse of the digital worker thus generated.

In one embodiment, a corresponding user interface is provided to a developer for creation of the digital worker in an integrated development environment (IDE). The IDE may be one of many known available IDEs preferred for the respective technologies or the embedded editor provided by the instant platform in the invention, facilitating creation of digital workers within their environments. A digital worker specification repository may be maintained in order to facilitate a developer with referencing the same while digital worker creation. Each digital worker that is created is made to go through the typical test and review cycle to establish that the desired functionality is obtained by the digital worker before it is published for use.

In one embodiment, a Framework Compatibility Testing is done through the orchestration editor by automatically deploying and binding the digital workers and generating required UI for configuration automatically based on the specification provided for the digital worker. This will ensure the interchangeability of the digital workers. Interchangeability of digital workers are especially helpful in two scenarios 1. for reusing them in another embodiment where most of the activities to be automated are same and 2. when the target environment is undergoing a technology transformation where only the specific digital workers that are impacted by the transformation needs to be replaced within the workflow.

After successful completion of compatibility tests, Integration Testing is done through the orchestration editor by assembling the related digital workers and mapping the relevant data fields and business rules. This will ensure that interoperability of digital workers of various technologies with each other.

Apart from general code reviews specific to each technology, a Framework compatibility review is also performed through the orchestration editor by specific automatic rules to ensure that the digital worker is scalable and secure.

Once the Digital Worker is tested and reviewed, an SME skilled in the technology can deploy the digital worker in the target environment using standard deployment methodologies specific to that technology. Alternatively, this can be performed using machine learning techniques emulating the decisions taken by an SME based on specified parameters. The orchestration editor has the capability to automatically deploy the digital workers when they are executed. The digital workers can be manually executed or scheduled to execute automatically at a predefined time, interval or event, using the user interface provided for maintaining the digital workers. During the execution of the digital worker, the activities performed by the digital worker can be logged through standardized logging and telemetry services available within the framework, which can be used for troubleshooting in case of issues as well as for telemetry reporting. The digital worker's execution status can be monitored at any given time, using the user interface provided for monitoring and maintaining the digital workers.

In one embodiment, as newer versions of the digital workers are released, older version will be deprecated to avoid redundancy.

Figure 4:
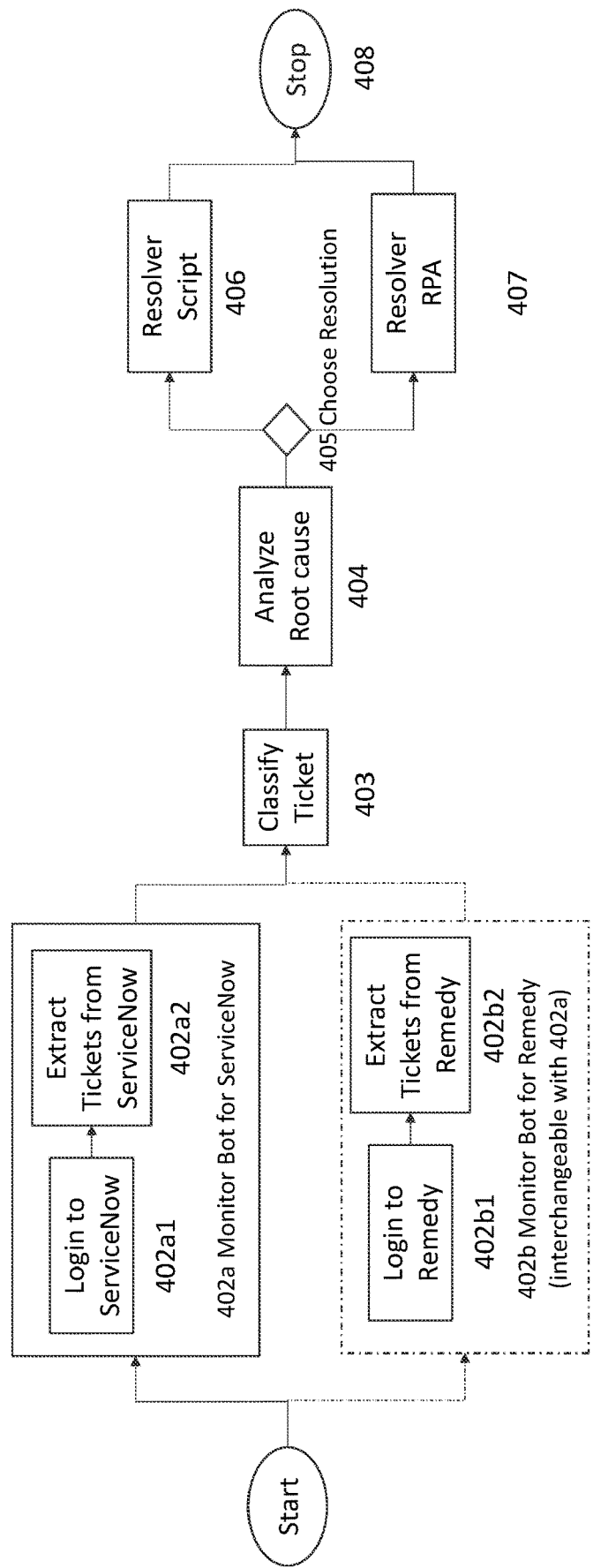
FIG. 4 is a functional block diagram of an example of a method for automating one particular step of monitoring a set of incidents in a workflow.

In a specific example of the system, as explained in FIG. 4, an end to end process for automating one particular step of monitoring a set of incidents in a workflow is illustrated. Some examples of the workflow may be, but not limited to, ServiceNow, Remedy etc. In task 402a, a combination of digital workers are configured to monitor the Incidents in the ServiceNow workflow. The first step in the process is to break down the activity into smaller tasks like logging in to ServiceNow (402a1) and extracting the ticket details (402a2). An SME skilled in the Automation methodology may help to identify the activities that can be broken down into smaller, reusable tasks. Alternatively, machine learning schemes may be used to achieve this to emulate the actions taken by an SME These tasks are performed by specifically pre-configured individual digital workers. In task 402b, a combination of digital workers is configured to monitor the Incidents in Remedy workflow. 402b1 and 402b2 are equivalents of 402a1 and 402a2 respectively.

Subsequently, Specification for each individual task assigned to a digital worker is generated using the orchestration editor. This specification may be generated in a generic way such that it can support most of the IT Service Management (ITSM) tools and can be reused to automate similar activities performed by other embodiments. An SME skilled in the architecture and workflow of the ITSM tools may provide the template for generation of such specification. Alternatively, machine learning techniques may be used to achieve this wherein the aforementioned factors may be the used as the parameters to emulate the actions taken by an SME. This enables the interchangeability of 402a with 402b or another similar combination of digital workers based on the ITSM tool used in the target environment. For task 402a1, the specification for the digital worker defines the input parameters required to login to ServiceNow, like URL, Login ID, Password, etc. The specification may also define the output parameter like Status which will indicate whether the login was successful and if the subsequent digital worker can be executed. Similarly, the specification for a digital worker in step 402a2 may include input parameters like Application name, Ticket status and/or any additional filtering criteria. The output parameter may include the Ticket details, file format and location of the file. Interoperability between the digital workers is achieved by defining the specification for the next task i.e., Ticket Classification (403) where the output of task 402a2 or 402b2 i.e., extracted Ticket Details is considered as one of the input parameters. This enables the Classification to be achieved for that specific ticket and the process continues for each ticket in the list. Once the ticket classification is done, the next task is Root Cause Analysis (404) where the process is repeated similar to task 403 i.e., output of task 403 is considered as one of the input parameters. This enables the Root Cause Analysis to be achieved for that specific ticket and the process continues for each ticket in the list.

Once the Specification is defined, the next step is selection of the technology in which the digital worker has to be created. The selection is performed based on multiple factors like the compatibility of the technology in the target environment where the digital worker will be executed, availability of existing, reusable digital worker in that specific technology, architectural consideration whether the digital worker should be based on BPA (backend automation) or RPA (frontend automation) and the skillset of the developers who will create and manage the digital workers. An SME skilled in the architecture and workflow of the ITSM tools may decide the technology. Alternatively, machine learning techniques may be used to achieve this wherein the aforementioned factors may be the used as the parameters to emulate the actions taken by an SME.

The orchestration editor is used to generate the Digital workers by an SME skilled in that particular Technology, based on the Specification, predefined templates and user interface provided for creation of the digital worker in an integrated development environment (IDE). Alternatively, machine learning schemes may be used to achieve this wherein the aforementioned factors may be the used as the parameters to emulate the actions taken by an SME.

Orchestration editor is used to generate a sequence for the digital workers and create a workflow as depicted in FIG. 4. The orchestration editor also provides options to execute specific steps based on certain conditions that can be predefined as depicted in task 405. Based on the output of task 404, the appropriate resolution task (406 or 407) is decided as part of task 405. The orchestration editor will execute either task 406 or task 407 based on the output of task 405.

Although the present embodiments have been described with reference to specific examples, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a non-transitory machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a non-transitory machine-readable medium and/or a machine accessible medium compatible with a data processing system (e.g., a computer devices), and may be performed in any order (e.g., including using means for achieving the various operations). The medium may be, for example, a memory, a transportable medium such as a CD, a DVD, or a portable memory device. A computer program embodying the aspects of the exemplary embodiments may be loaded onto the retail portal. The computer program is not limited to specific embodiments discussed above, and may, for example, be implemented in an operating system, an application program, a foreground or background process, a driver, a network stack or any combination thereof. The computer program may be executed on a single computer processor or multiple computer processors.

Moreover, as disclosed herein, the term "non-transitory computer-readable medium" includes, but is not limited to portable or fixed storage devices, optical storage devices and various other mediums capable of storing or containing data.

Accordingly, the specification and drawings are to be regarded in an illustrative rather than a restrictive sense.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer implemented method for generating of platform agnostic digital worker comprising:
   identifying, by a computing device, a task to be performed by a digital worker;
   generating, by the computing device, a specification for the digital worker, wherein the specification comprises at least a predefined standard for configuration of input and output parameters and error handling, wherein the digital worker is further configured to communicate across heterogeneous platforms based on the predefined specification using a common data communication format, and wherein the predefined specification comprises a template to define input, output and exception details;
   receiving, by the computing device, a digital worker created by an agent based on the specification to deploy the digital worker at an orchestration engine;
   sequencing, by the computing device, the digital worker, into a repository of digital workers in a predefined manner of workflow, wherein the digital worker is configured to execute sequentially to perform a scheduled task and wherein the repository of digital workers is generated based on the digital worker metadata information, digital worker binaries, and digital worker source code.

2. The method of claim 1, wherein the communication between digital workers across heterogeneous systems comprises interchanging the digital worker performing similar task according to the target environment from the repository using the common data communication format.

3. The method of claim 1, further comprising:
   retrieving, by the computing device, the digital worker metadata and configuration parameters from the repository when a user accesses the digital worker using the user interface provided for maintaining the digital worker.

4. The method of claim 1, wherein the digital workers can be interconnected or interchangeable within a configuration editor.

5. A system for generating of platform agnostic digital worker; comprising
   a processor; and a memory coupled to the processor configured to execute programmed instructions comprising and stored in the memory to;

identify a task to be performed by the digital worker;

generate a specification for the digital worker, wherein the specification comprises at least a predefined standard for configuration of input and output parameters and error handling, wherein the digital worker is further configured to communicate across heterogeneous platforms based on the predefined specification using a common data communication format, and wherein the predefined specification comprises a template to define input, output and exception details;

receive a digital worker created by an agent based on the specification to deploy the digital worker at an orchestration engine; and sequence the digital worker, into a repository of digital workers in a predefined manner of workflow, wherein the digital worker is configured to execute sequentially to perform a scheduled task and wherein the repository of digital workers is generated based on the digital worker metadata information, digital worker binaries, and digital worker source code.

6. The system of claim 5, wherein the communication of the digital worker across heterogeneous systems comprises interchanging the digital worker performing similar task according to the target environment from the repository using the common data communication format.

7. The system of claim 5, wherein the memory further comprises programmed instructions to:

retrieve the digital worker metadata and configuration parameters from the repository.

8. The system of claim 5, wherein the digital worker can be shared with non-native repositories by marking the respective digital worker as shareable.

9. A non-transitory computer readable medium having stored thereon instructions, the non-transitory computer readable medium comprising machine executable code which when executed by at least one processor, causes the at least one processor to:

identify a task to be performed by the digital worker;

generate a specification for the digital worker, wherein the specification comprises at least a predefined standard for configuration of input and output parameters and error handling, wherein the digital worker is further configured to communicate across heterogeneous platforms based on the predefined specification using a common data communication format, and wherein the predefined specification comprises a template to define input, output and exception details;

receive a digital worker created by an agent based on the specification to deploy the digital worker at an orchestration engine; and sequence the digital worker, into a repository of digital workers in a predefined manner of workflow, wherein the digital worker is configured to execute sequentially to perform a scheduled task and wherein the repository of digital workers is generated based on the digital worker metadata information, digital worker binaries, and digital worker source code.

10. The non-transitory computer readable medium of claim 9, wherein the communication between digital workers across heterogeneous systems comprises interchanging the digital worker performing similar task according to the target environment from the repository using the common data communication format.

11. The non-transitory computer readable medium of claim 9, wherein the machine executable code which when executed by at least one processor, causes the at least one processor to:

retrieve the digital worker metadata and configuration parameters from the repository when a user accesses the digital worker using the user interface provided for maintaining the digital worker.

12. The non-transitory computer readable medium of claim 9, wherein the digital workers can be interconnected or interchangeable within a configuration editor.

* * * * *